(12) United States Patent
Sugimoto

(10) Patent No.: US 7,376,347 B2
(45) Date of Patent: May 20, 2008

(54) DIGITAL STILL CAMERA, IMAGE REPRODUCING APPARATUS, FACE IMAGE DISPLAY APPARATUS AND METHODS OF CONTROLLING SAME

(75) Inventor: Masahiko Sugimoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 327 days.

(21) Appl. No.: 11/087,577

(22) Filed: Mar. 24, 2005

(65) Prior Publication Data

US 2005/0219393 A1   Oct. 6, 2005

(30) Foreign Application Priority Data

Mar. 31, 2004   (JP) ............................. 2004-101783
Jan. 26, 2005   (JP) ............................. 2005-017554

(51) Int. Cl.
*G03B 13/02*   (2006.01)
*H04N 5/222*   (2006.01)

(52) U.S. Cl. ............... 396/60; 396/374; 348/333.12

(58) Field of Classification Search ............ 396/60, 396/373, 374, 378; 348/333.12, 240.2, 333.01, 348/333.02
See application file for complete search history.

(56) References Cited

U.S. PATENT DOCUMENTS 6,035,074 A   3/2000   Fujimoto et al. .......... 382/282
6,785,469 B1*   8/2004   Ide et al. .................... 396/121
7,230,648 B2*   6/2007   Ueno .......................... 348/340
2004/0145670 A1   7/2004   Hong ..................... 348/333.01

FOREIGN PATENT DOCUMENTS

| CN | 1517952 | 8/2004 |
|---|---|---|
| KR | 2003-0006539 | 1/2003 |
| KR | 2004-0065786 | 7/2004 |

OTHER PUBLICATIONS

Chinese Office Action dated Jun. 15, 2007.
Korean Office Action dated Nov. 17, 2006, with English translation.

* cited by examiner

*Primary Examiner*—W. B. Perkey
*Assistant Examiner*—Rishi S. Suthar
(74) *Attorney, Agent, or Firm*—McGinn IP Law Group, PLLC

(57) ABSTRACT

The image of a subject is sensed, the image of the subject is displayed on the display screen of a digital still camera and the image of a face is detected in the image of the subject. The image of the subject is shifted in such a manner that the center of the detected face image becomes the center of the display screen, and the image is enlarged and displayed on the display screen. Since the image of the face is displayed in enlarged form, it becomes easier to check the face even if the display screen is small in size.

8 Claims, 17 Drawing Sheets

DIGITAL STILL CAMERA, IMAGE REPRODUCING APPARATUS, FACE IMAGE DISPLAY APPARATUS AND METHODS OF CONTROLLING SAME

BACKGROUND OF THE INVENTION

1. Field of the Invention

This invention relates to a digital still camera (inclusive of an information device having the function of a digital still camera, an example of which is a mobile telephone equipped with a camera), an image reproducing apparatus, a face image display apparatus and methods of controlling these.

2. Description of the Related Art

In cases where the image of a subject is sensed using a digital still camera, the image of the subject is displayed on a display screen that is provided on the back of the digital still camera. The camera angle is decided while viewing the image of the subject displayed on the display screen. In a case where the image of a person is sensed, it is necessary to check whether the part of the person that is the face is in focus. However, as the display screen provided on the back of a digital still camera is comparatively small, whether the image is in focus, etc., is difficult to confirm.

If an image contains the image of a face, the image of the face is recognized based upon face-recognition color data and the image of the face recognized is cut out of the image (see the specification of Japanese Patent Application Laid-Open No. 10-334213). However, bringing the camera into focus on the face of a person when the image of the person is sensed has not been contemplated.

DISCLOSURE OF THE INVENTION

Accordingly, an object of the present invention is to make it easier to recognize the face of a person.

Another object of the present invention is to so arrange it that if an object of interest contains the image of a face, the part of the image that is the face can be enlarged.

According to a first aspect of the present invention, the foregoing object is attained by providing a digital still camera comprising: an image sensing device for sensing the image of a subject and outputting image data representing the image of the subject; a display device for displaying the image of the subject, which is represented by the image data that has been output from the image sensing device, on a display screen; a face image detecting device (face image detecting means) for detecting a face image contained in the image of the subject represented by the image data that has been output from the image sensing device; an enlargement command device for applying an enlargement command; an enlarging device (enlarging means) for enlarging the face image (the image of the subject that includes the face image), which has been detected by the face image detecting device, in response to application of the enlargement command from the enlargement command device; a first display control device (first display control means) for controlling the display device in such a manner that the face image enlarged by the enlarging device is displayed on the display screen; a shutter-release button; and a recording control device (recording control means) for recording the image data, which has been output from the image sensing device, on a recording medium in response to depression of the shutter-release button.

The first aspect of the present invention also provides a control method suited to the digital still camera described above. More specifically, the present invention provides a method of controlling a digital still camera, which is provided with a shutter-release button, for sensing the image of a subject and obtaining image data representing the image of the subject, and further having a display device for displaying the image of the subject, which is represented by the obtained image data, on a display screen, the method comprising the steps of: detecting a face image contained in the image of the subject represented by the obtained image data; enlarging the detected face image in response to application of an enlargement command; controlling the display device in such a manner that the enlarged face image is displayed on the display screen; and recording the image data, which has been obtained by image sensing, on a recording medium in response to depression of the shutter-release button.

In accordance with the first aspect of the present invention, the image of a subject is displayed on a display screen by sensing the image of the subject. A face image that is contained in the image of the subject is detected. When an enlargement command is applied, the detected face image is enlarged and displayed on a display screen. If a shutter-release button is pressed, image data representing the image of the subject is recorded on a recording medium.

Since an enlarged image of the face is displayed on the display screen in response to application of the enlargement command, whether the part of the subject that is the face is in focus or not can be checked in a comparatively simply manner.

If the shutter-release button is of a two-step stroke type, the enlargement device would enlarge the face image, which has been detected by the face image detecting device, in response to depression of the shutter-release button through a first step of its stroke, and the recording control device would record the image data, which has been output from the image sensing device, in response to depression of the shutter-release button through a second step of its stroke.

According to a second aspect of the present invention, the foregoing object is attained by providing an image reproducing apparatus comprising: a reading device for reading image data, which represents the image of a subject, from a recording medium; a face image detecting device (face image detecting means) for detecting a face image contained in the image of the subject represented by the image data that has been read by the reading device; an enlarging device (enlarging means) for enlarging the face image that has been detected by the face image detecting device; and a first display control device (first display control means) for controlling a display device in such a manner that the face image enlarged by the enlarging device is displayed on the display screen.

The second aspect of the present invention also provides a control method suited to the image reproducing apparatus described above. More specifically, the present invention provides a method of controlling an image reproducing apparatus, comprising the steps of: reading image data, which represents the image of a subject, from a recording medium; detecting a face image contained in the image of the subject represented by the image data that has been read; enlarging the face image that has been detected; and controlling a display device in such a manner that the enlarged face image is displayed on the display screen.

In accordance with the second aspect of the present invention, image data representing the image of a subject is read from a recording medium, whereupon the image of a face contained in the image of a subject represented by the read image data is detected. The detected face image is enlarged and displayed on the display screen of a display device. Since the image of the face is enlarged and displayed, whether the part of the subject that is the face is in focus or not can be checked in a comparatively simply manner.

Preferably, the digital still camera or the image reproducing apparatus further comprises a determination device (determination means) for determining whether face image enlargement processing has been set or whether a face image enlargement command has been applied, and a second display control device (second display control means) for controlling the display device in such a manner that the image of the subject, which is represented by the image data read by the image reading device, is displayed on the display screen in response to a determination by the determination device that face image enlargement processing has not been set or that a face image enlargement command has not been applied. In this case, the first display control device would control the display device so as to display the image of the face, which has been enlarged by the enlarging device, on the display screen in response to a determination by the determination device that face image enlargement processing has been set or that a face image enlargement command has been applied.

Preferably, the first display control device controls the display device so as to display the enlarged image in such a manner that the center of the face image that has been enlarged by the enlarging device will become the center of the display screen.

Preferably, the digital still camera or the image reproducing apparatus further comprises a first determination device (first determination means) for determining whether portions outside the image of the subject represented by the image data that is output from the image sensing device will be displayed on the display screen owing to the fact that the center of the face image that has been enlarged by the enlarging device becomes the center of the display screen based upon control by the first display control device; and a decision device (decision means) for deciding position of the center of the face image, which has been enlarged by the enlarging device, in such a manner that portions outside the image of the subject will not be displayed on the display screen, in response to a determination by the first determination device that the portions outside the image of the subject will be displayed on the display screen.

By displaying the image of a face upon enlarging the image, portions that have not undergone image sensing will not be displayed on the display screen, thereby making it possible to prevent an unattractive image from being displayed.

The digital still camera or the image reproducing apparatus may further comprise a second determination device (second determination means) for determining whether the center of the face image detected by the face image detecting device lies within a predetermined area on the display screen. In this case, the first display control device would respond to a determination by the second determination device that the center of the detected face image lies within the predetermined area by controlling the display device in such a manner that the center of the enlarged face image becomes the center of the display screen, and would respond to a determination by the second determination device that the center of the detected face image does not lie within the predetermined area by deciding the position of the center of the face image in such a manner that portions outside the image of the subject will not be displayed on the display screen and controlling the display device in such a manner that the center of the enlarged image will be displayed at the decided position.

In this case also the image of a face is displayed upon being enlarged, thereby making it possible to prevent portions that have not undergone image sensing from being displayed on the display screen.

The face image detecting device may be provided with an evaluation-value calculating device (evaluation-value calculating means) for calculating an evaluation value of facial likeliness with respect to part of an image contained in the subject. In this case, the face image detecting device would detect the image of a face based upon the evaluation value calculated by the evaluation-value calculating device. The image reproducing apparatus would further comprise a second determination device (second determination means) for determining whether a plurality of face images have been detected by the face image detecting device; a second display control device (second display control means), responsive to a determination by the second determination device that there are a plurality of face images, for controlling the display device in such a manner that the order of facial likelinesses of the plurality of face images is displayed on the display screen in correspondence with the plurality of face images; and a designating device for designating one face image among the plurality of face images.

Thus, in the event that the image of a subject contains a plurality of face images, a desired face image can be enlarged and displayed.

The digital still camera or the image reproducing apparatus may further comprise a third display control device (third display control means) for controlling the display device in such a manner that areas of the plurality of face images are displayed in different forms based upon the order of the facial likelinesses.

The digital still camera or the image reproducing apparatus may further comprise a fourth determination device (fourth determination means) for determining whether a plurality of face images have been detected by the face image detecting device; a decision device (decision means), responsive to a determination by the fourth determination device that there are a plurality of face images, for deciding the order of the plurality of face images based upon at least one factor from among facial likelinesses of the face images, brightnesses of the face images and sizes of the face images; a fourth display control device (fourth display control means) for controlling the display device in such a manner that the order of the face images decided by the decision device is displayed on the display screen in correspondence with the plurality of face images; and a designating device for designating one face image among the plurality of face images. In this case, the enlarging device would enlarge a face image that has been designated by the designating device.

The digital still camera or the image reproducing apparatus may further comprise a factor designating device for designating at least one factor among the facial likelinesses of the face images, brightnesses of the face images and sizes of the face images used in deciding the order of the plurality of face images in the decision device. In this case, the decision device would decide the order of the plurality of face images based upon the factor that has been designated by the factor designating device.

According to a third aspect of the present invention, the foregoing object is attained by providing a face image display apparatus comprising: a face image detecting device (face image detecting means) for detecting a face image contained in an image of interest; an enlarging device (enlarging means) for enlarging the face image that has been detected by the face image detecting device; and a display control device (display control means) for controlling a display device so as to display the face image that has been enlarged by the enlarging means.

The third aspect of the present invention also provides a control method suited to the face image display apparatus described above. More specifically, the present invention provides a method of controlling a face image display apparatus, comprising the steps of: detecting a face image contained in an image of interest; enlarging the face image detected; and controlling a display device so as to display the face image that has been enlarged.

In accordance with the third aspect of the present invention, the image of a face contained in an image of interest is detected, the detected face image is enlarged and the enlarged face image is displayed. Since the image of a face contained in an image of interest is displayed upon being enlarged, a large face image is displayed even in a case where the face image is small in comparison with the image of interest. This makes it possible to check the details of the face image.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the drawings.

Figure 1:
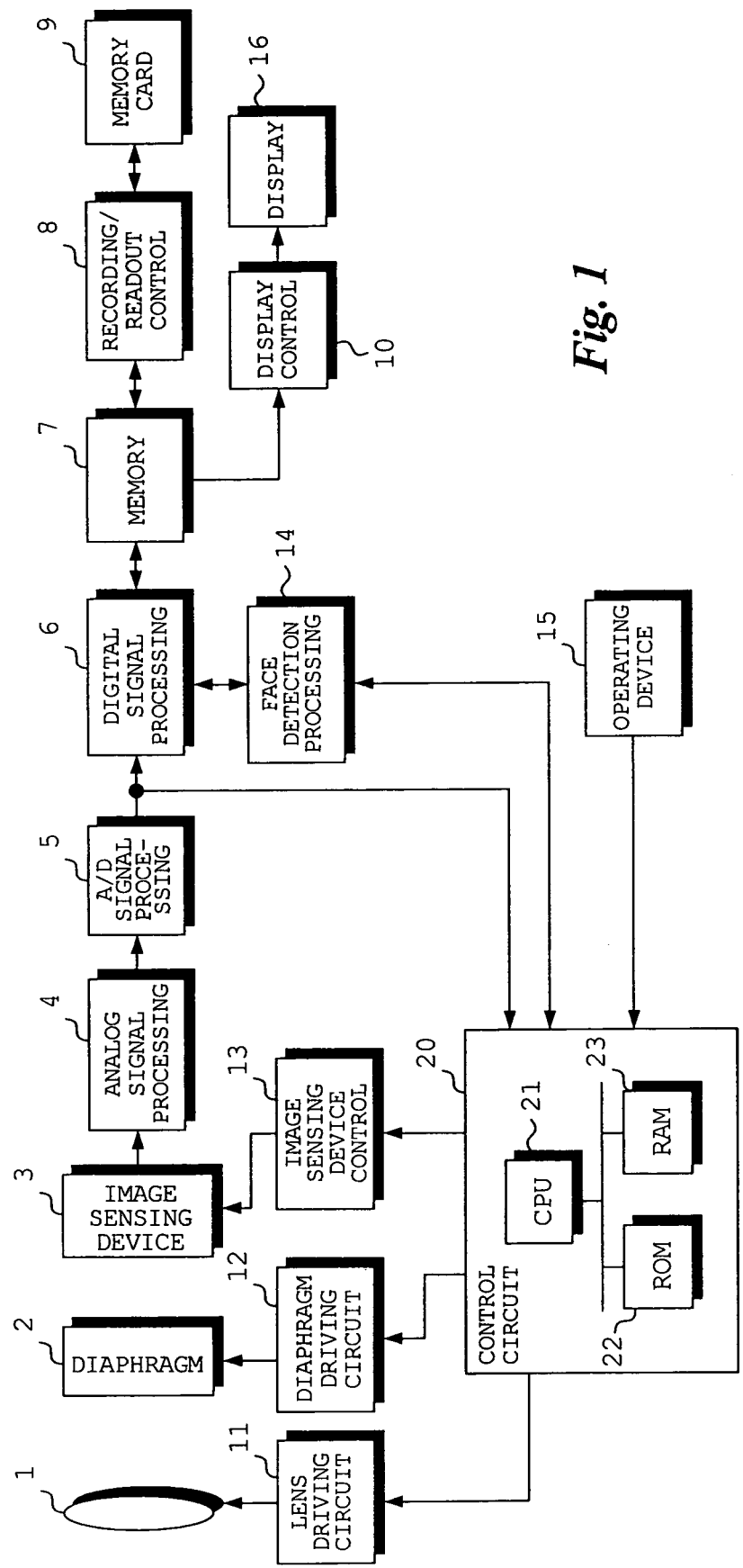
FIG. 1 is a block diagram illustrating the electrical structure of a digital still camera.

FIG. 1 is a block diagram illustrating the electrical structure of a digital still camera according to the present invention.

The digital still camera according to this embodiment is such that if the face of a person appears in a subject, the image of the face (the part of the image of the subject that contains the image of the face) can be enlarged and displayed. Even in a case where the display screen is small and the entire image of the subject is displayed on the display screen, displaying the image of the face in enlarged form makes it possible to check whether the face is being sensed appropriately.

The overall operation of the digital still camera is controlled by a control circuit 20.

The control circuit 20 includes a CPU 21, a ROM 22 and a RAM 23 interconnected by a bus. Sample image data of faces for detecting the face images has been stored in the ROM 22. It goes without saying that data for detecting face images may be stored rather than sample image data of faces. The RAM 23 stores image data and the like temporarily.

The digital still camera includes an operating device 15 having an enlargement command button for applying a command to enlarge the image of a face, a shutter-release button of two-step stroke type, an OK button, a cancel button, a mode setting dial and up, down, left, right button. An operating signal that is output from the operating device 15 is input to the control circuit 20.

The zoom position of a zoom lens 1 is controlled by a lens driving circuit 11. The aperture of a diaphragm 2 is controlled by a diaphragm driving circuit 12. A light beam representing the image of a subject is condensed by the zoom lens 1 and impinges upon an image sensing device 3 such as a CCD through the diaphragm 2. A light image representing the image of the subject is formed on the photoreceptor surface of the image sensing device 3.

If an image sensing mode is set by a mode setting dial, the image sensing device 3 is controlled by a control circuit 13 for the image sensing device 3, which outputs a video signal representing the image of the subject. The video signal is subjected to analog signal processing such as correlated double sampling in an analog signal processing circuit 4. The video signal that is output from the analog signal processing circuit 4 is converted to digital image data in an analog/digital signal processing circuit 5 and the digital image data is input to the control circuit 20 and to a digital signal processing circuit 6. Digital signal processing such as a gamma correction and white balance adjustment is executed in the digital signal processing circuit 6.

The image data that has been output from the digital signal processing circuit 6 is applied to a display control circuit 10 via a memory 7. The image of the subject is displayed on the display screen of a display unit 16 by the display control circuit 10.

The image data that has been output from the digital signal processing circuit 6 is also input to a face detection processing circuit 14. The part of the image of the subject that is the face is detected in the face detection processing circuit 14. Although the details will be described later, the command to enlarge the image of the face is applied to the digital still camera if the enlargement button is pressed. In response, if the image of a face is contained in the image of the subject obtained by image sensing, then the image of the face is enlarged (the entire image of the subject is enlarged so as to include the image of the face) and displayed on the display screen of the display unit 16.

If the shutter-release button is pressed through the first step of its stroke, the image data that has been output from the analog/digital signal processing circuit 5 is applied to the control circuit 20 as described above. The lens driving circuit 11, diaphragm driving circuit 12 and shutter speed are controlled by the control circuit 20 so as to perform autofocus control and automatic exposure control using the entered image data.

If the shutter-release button is pressed through the second step of its stroke, the image of the subject is sensed again and image data representing the image of the subject is obtained in the manner described above. This image data is applied from the digital signal processing circuit 6 to the memory 7, where the image data is stored temporarily. The image data is read out of the memory 7 and recorded on a memory card 9 by a recording/readout control circuit 8. It goes without saying that data compression may applied as necessary.

If a playback mode is set by the mode setting dial, image data representing the image of the subject is read out of the memory card 9 by the recording/readout control circuit 8. The image data that has been read out is input to the display control circuit 10 through the memory 7. The image of the subject represented by the image data that has been read from the memory card 9 is displayed on the display screen of the display unit 16.

By pressing the enlargement command button in a case where the playback mode has been set, the image of a face will be enlarged and displayed if the image of the face is contained in the image represented by image data read from the memory card 9. In a case where the playback mode has been set, the image data that has been read from the memory card 9 is applied to the face detection processing circuit 14 via the memory 7 and digital signal processing circuit 6 if the enlargement command button is pressed. The part of the image that is the face is detected by the face detection processing circuit 14. Image enlargement processing (which can be implemented by image data interpolation processing or the like) is executed in such a manner that the detected face image is displayed on the display screen. The enlarged image is displayed on the display screen of the display unit 16. Processing described later can be executed also at the time of playback.

Figure 2:
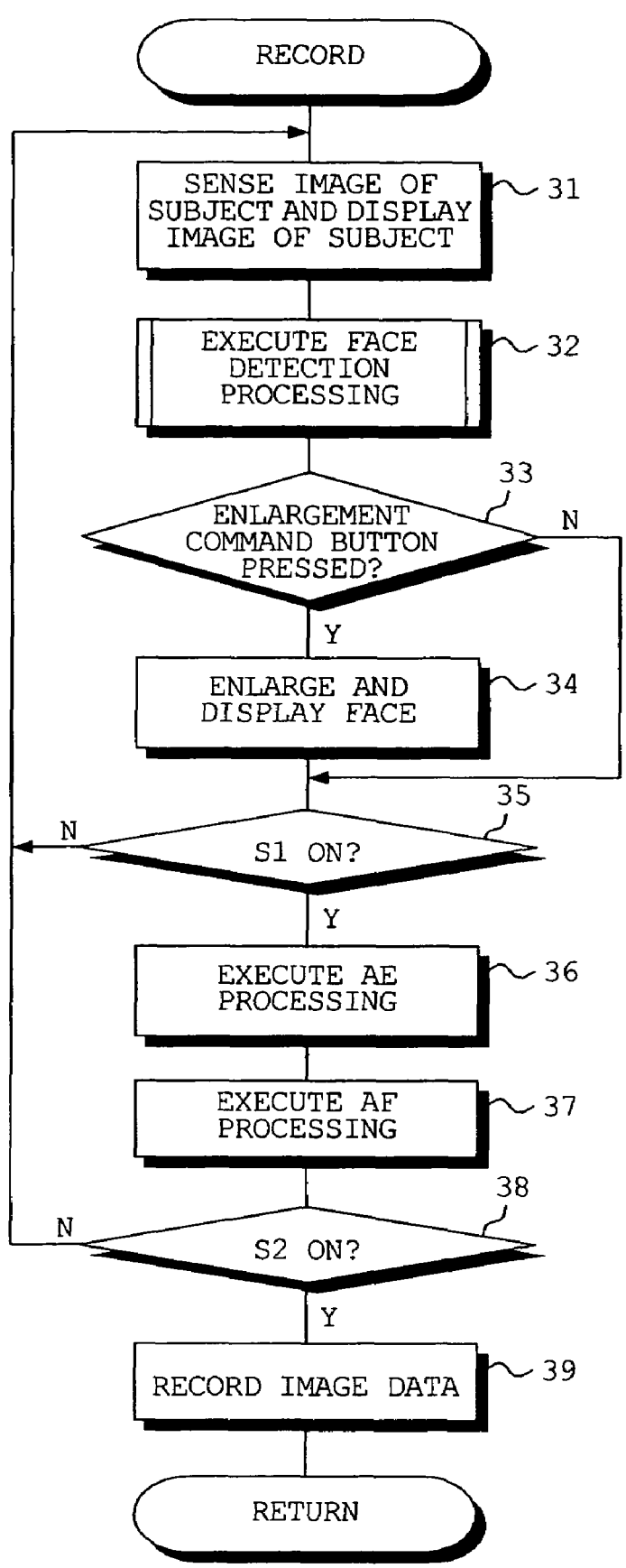
FIG. 2 is a flowchart illustrating recording processing.

FIG. 2 is a flowchart illustrating processing executed when recording is performed by the digital still camera according to this embodiment.

If the image sensing mode is set, the image of the subject is sensed and image data representing the image of the subject is obtained (step 31) in the manner described above. The obtained image data is applied to the display unit 16, whereby the image of the subject is displayed on the display screen of the display unit 16. The image data representing the image of the subject is also applied to the face detection processing circuit 14, whereby processing for detecting the image of a face contained in the image of the subject is executed (step 32). The details of this face detection processing and face-frame display processing will be described later.

If the enlargement command button is pressed ("YES" at step 33), then, in a case where the image of a face is contained in the image of the subject obtained by image sensing, the image of the face is enlarged and displayed on the display screen of the display unit 16 in such a manner that the center of the image of the face becomes the center of the display screen (step 34). However, in the event that a portion that is outside the image of the subject will be displayed owing to such enlargement, the image of the subject is enlarged upon being shifted relative to the display screen in such a manner that a portion that is outside the image of the subject will not be displayed. In a case where the image of a face does not exist in the image of the subject, the enlargement processing of step 34 is skipped. It goes without saying that processing for enlarging the image of the subject may be executed if desired even if no face image exists.

If the shutter-release button is pressed through the first step of its stroke ("YES" at step 35), then automatic exposure control (step 36) and autofocus control (step 37) is executed using image data that has been output from analog/digital signal processing circuit 5, as described above.

If the shutter-release button is pressed through the second step of its stroke ("YES" at step 38), then the image data that has been obtained by image sensing is recorded on the memory card (a freely removable recording medium) 9 (step 39).

Figure 3:
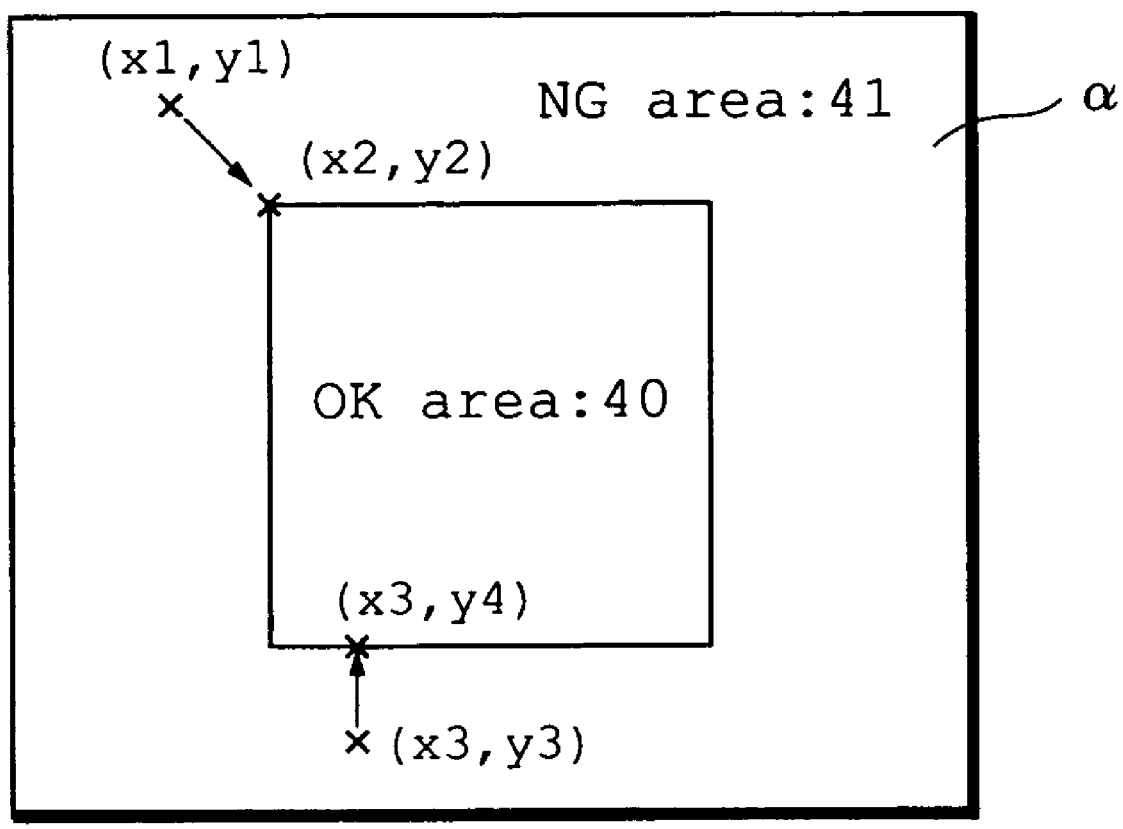
FIG. 3 illustrates OK and NG areas.

FIG. 3 illustrates an area in which enlargement is performed in such a manner that the center of a face image becomes the center of a display screen in a case where the image of the subject is enlarged, and an area in which enlargement is performed in such a manner that the center of a face image does not become the center of the display screen in a case where the image of the subject is enlarged.

Let $\alpha$ represent the image of the subject. A prescribed area 40 that is the result of constricting the outside border of the image of the subject (the outside border corresponds to the image sensing zone and to the display screen) is an OK area 40 which, if the subject image $\alpha$ contains the image of a face, is for performing enlargement in such a manner that the center of the face image becomes the center of the display screen. The area surrounding the OK area 40 is an NG area 41, which is for performing enlargement in such a manner that the center of the face image does not become the center of the display screen. If the center of the face image lies in the OK area 40, then the image of the subject is enlarged in such a manner that the center of the face image becomes the center of the display screen. If the center of the face image lies in the NG area 41, then enlargement processing is applied to the image of the subject in such a manner that the center of the face image will be brought to a position closest to the OK area 40.

By way of example, if the center of the face image is situated at coordinates (x1, y1) to the upper left of the upper left corner of the OK area 40, then the image of the subject is enlarged upon shifting the entire image of the subject in such a manner that coordinates (x2, y2) of the OK area 40 nearest to the coordinates (x1, y1) become the center of the face image. Further, if the center of the face image is situated at coordinates (x3, y3) beneath the OK area 40, then the image of the subject is enlarged upon shifting the entire image of the subject in such a manner that coordinates (x3, y4) become the center of the face image. Thus the face image is prevented from not being displayed owing to the enlargement of the image of the subject.

Figure 4A:
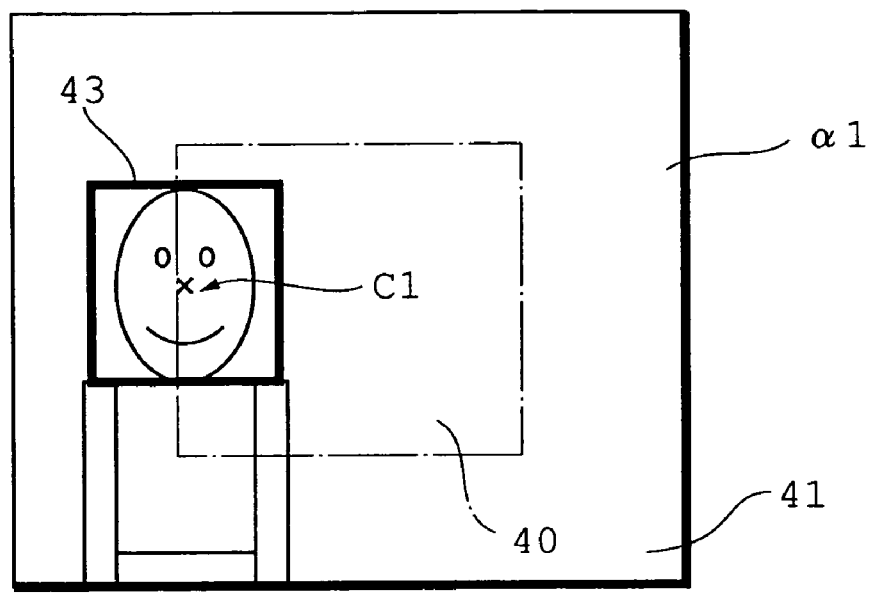
FIG. 4a illustrates an example of the image of a subject before zooming and FIG. 4b an example of the image of the subject after zooming.
Figure 4B:
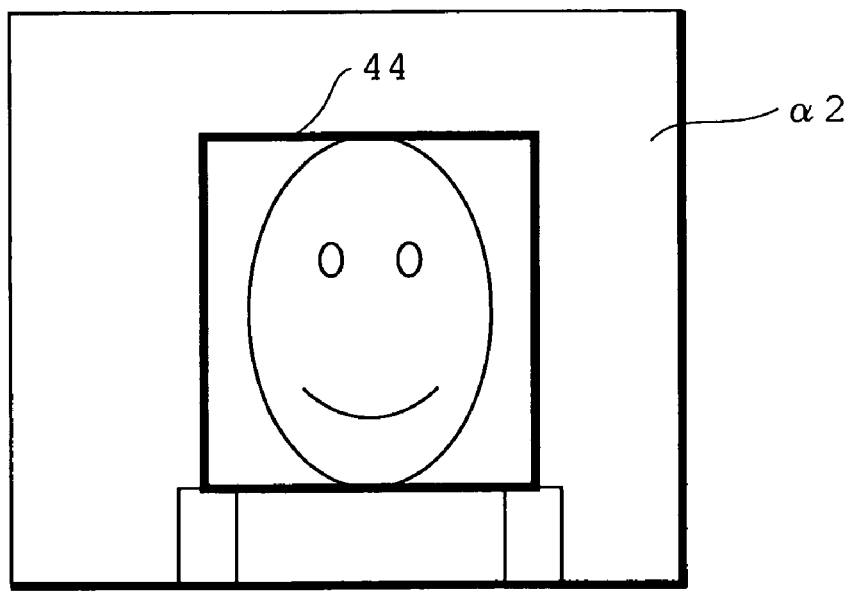

FIGS. 4a and 4b illustrate examples of the image of a subject displayed on the display screen of the display unit 16. FIG. 4a shows the image before enlargement and FIG. 4b shows the image after enlargement. The OK area 40 and NG area 41 illustrated in FIG. 3 are also shown in FIGS. 4a and 4b.

Search areas of various sizes are used to determine whether the image of a face exists within a subject image $\alpha 1$ (which is decided by the image sensing zone and also corresponds to the size of the display screen of display unit 16). Whether an image within a search area is the image of a face is judged based upon degree of matching between the images within search areas of various sizes and sample images of faces. The image within a search area (face frame) 43 for which the degree of matching between an image within the search area and the sample image of a face is greatest is judged to be the image of a face. The determination as to whether the image within the search area 43 is the image of a face may not only be made based upon the degree of matching between the image within the search area 43 and the sample image of the face but may also be made using the result of learning (which is data for discriminating facial likeliness using the sample image of a face or another image, and the data may be in the form of a table or the like and is not necessarily limited to a sample image).

In FIG. 4*a*, the center C1 of the image of the face (the search area 43 in which the enclosed image is judged to be the image of the face in the face frame) falls within the OK area 40. Accordingly, the subject image α1 is displayed upon being enlarged in such a manner that the center C1 of the face image becomes the center of the display screen (see FIG. 4*b*). This processing is executed in real time while image sensing is being performed.

A subject image α2 that contains the enlarged image of the face thus is displayed on the display screen of the display unit 16. Further, although the search area (face frame) 44 is being displayed in enlarged form in the part of the image that is the face, it goes without saying that this search area need not necessarily be displayed.

Figure 5A:
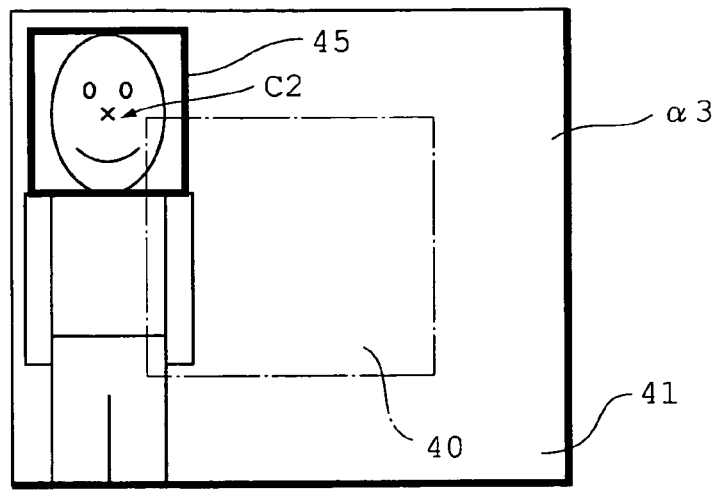
FIG. 5a illustrates an example of the image of a subject before zooming and FIGS. 5b and 5c examples of the image of the subject after zooming.
Figure 5B:
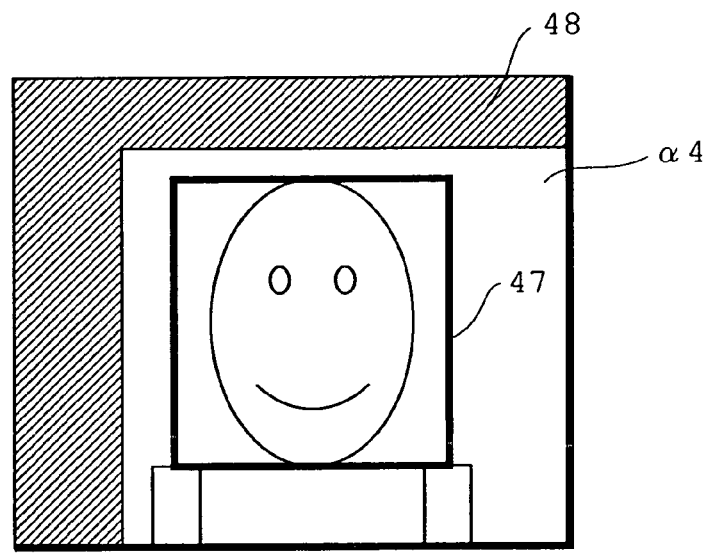
Figure 5C:
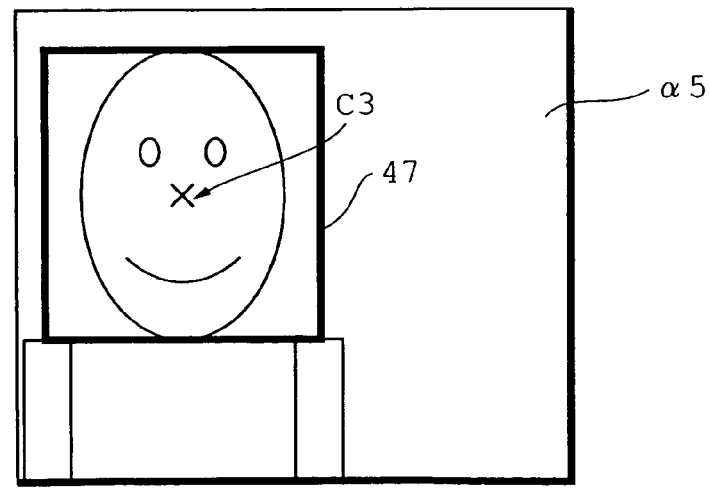

FIGS. 5*a* to 5*c* illustrate examples of the image of a subject displayed on a display screen. FIG. 5*a* illustrates the image before enlargement, FIG. 5*b* illustrates the image after it has been enlarged in such a manner that the center of the face image becomes the center of the display screen, and FIG. 5*c* illustrates the image after it has been enlarged in such a manner that the center of the face image is shifted away from the center of the display screen.

As shown in FIG. 5*a*, the center C2 of the face image within a face frame 45 contained in a subject image α3 lies within the NG area 41 outside the OK area 40. This means that if the subject image is shifted and enlarged in such a manner that the center C2 of the face image becomes the center of the display screen, a portion 48 in which a subject image α4 does not exist will be displayed on the display screen, as illustrated in FIG. 5*b*. In this embodiment, enlargement is performed upon deciding the center of the face image of a subject image α5 in such a manner that the center C3 of the face in a face frame 47 after enlargement will be situated at a position on the OK area 40 that is closest from the center C2 of the face image before enlargement.

Figure 6:
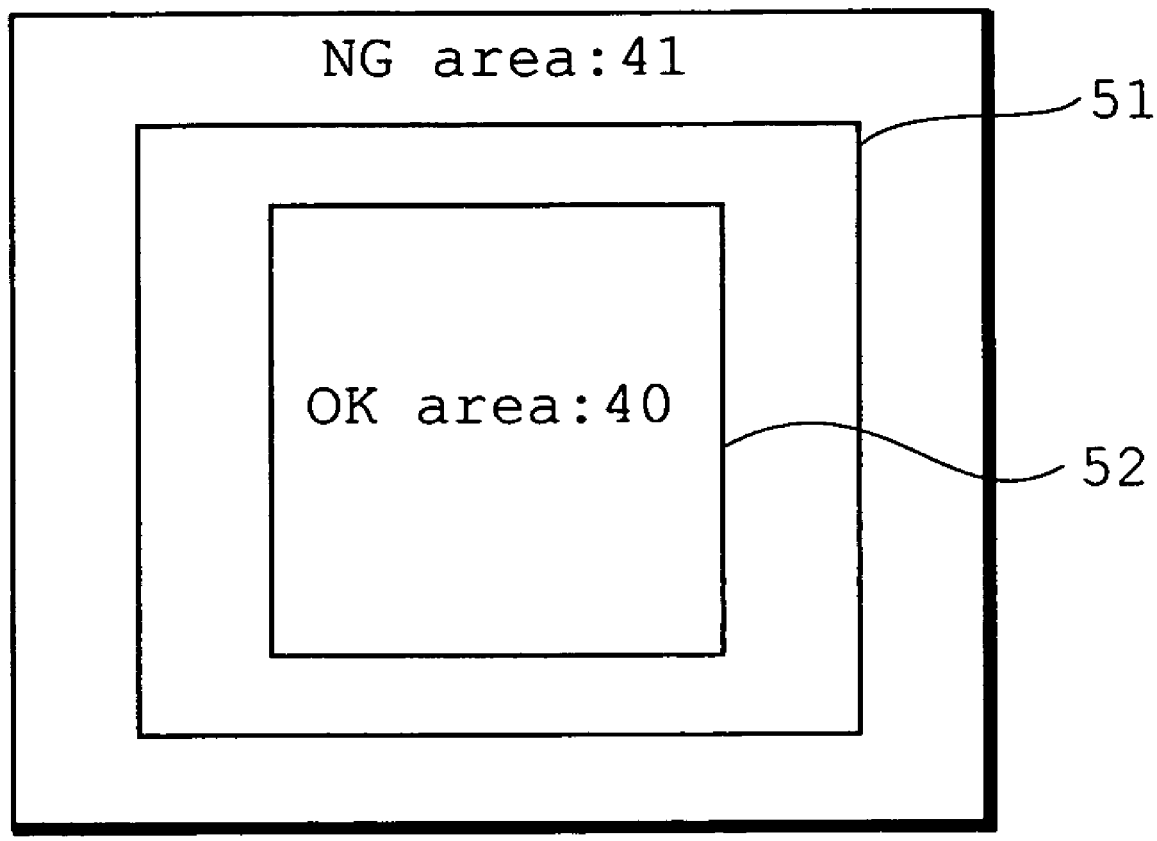
FIG. 6 illustrates OK and NG areas.

FIG. 6 illustrates the relationship between the OK area 40 and NG area 41.

The above-described OK area 40 and NG area 41 depend upon the enlargement ratio (the zoom magnification). The greater the zoom magnification, the larger the image after enlargement. Even if the center of a face image becomes the center of the display screen, therefore, portions in which the image of the subject is not displayed will not occur and, hence, the OK area 40 becomes larger. Conversely, the smaller the zoom magnification, the smaller the image after magnification. If the center of the face image becomes the center of the display screen, therefore, a portion where the image of the subject is not displayed is produced. For example, if the zoom magnification is 3×, then a boundary 51 between the OK area 40 and NG area 41 is defined in such a manner that the OK area 40 becomes comparatively large. If the zoom magnification is 1.5×, then a boundary 52 between the OK area 40 and NG area 41 is defined in such a manner that the OK area 40 becomes comparatively small.

Figure 7:
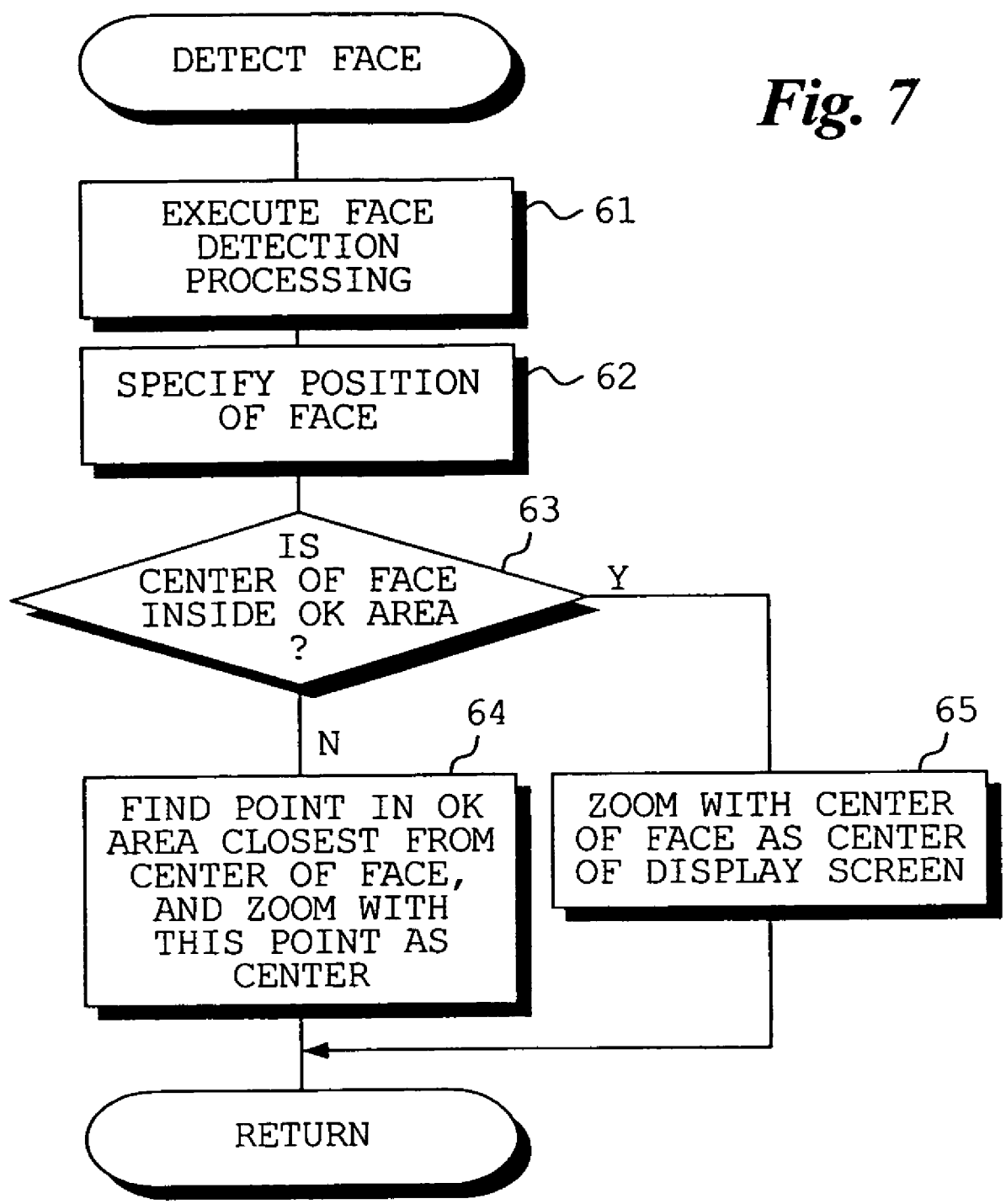
FIG. 7 is a flowchart illustrating processing for detecting a face.

FIG. 7 is a flowchart illustrating processing for detecting a face (the processing of step 32 in FIG. 2).

The image of a subject is scanned using search areas of various sizes and the part of the image that is a face is detected from the image of the subject (step 61). If the part of the image that is a face is detected, then the position of the face in the image of the subject is specified (step 62).

It is determined whether the center of the specified face image lies within the OK area in the manner described above (step 63). If the center lies within the OK area ("YES" at step 43), zoom processing is executed in such a manner that the center of the face image will become the center of the display screen (step 65). If the center does lie within the OK area (i.e., if it lies within the NG area), then the image of the subject is shifted in such a manner that a position within the OK area closest from the center of the face image will become the center of the face image (the shift can be implemented by an addressing operation) and zoom processing is executed (step 64).

Figure 8:
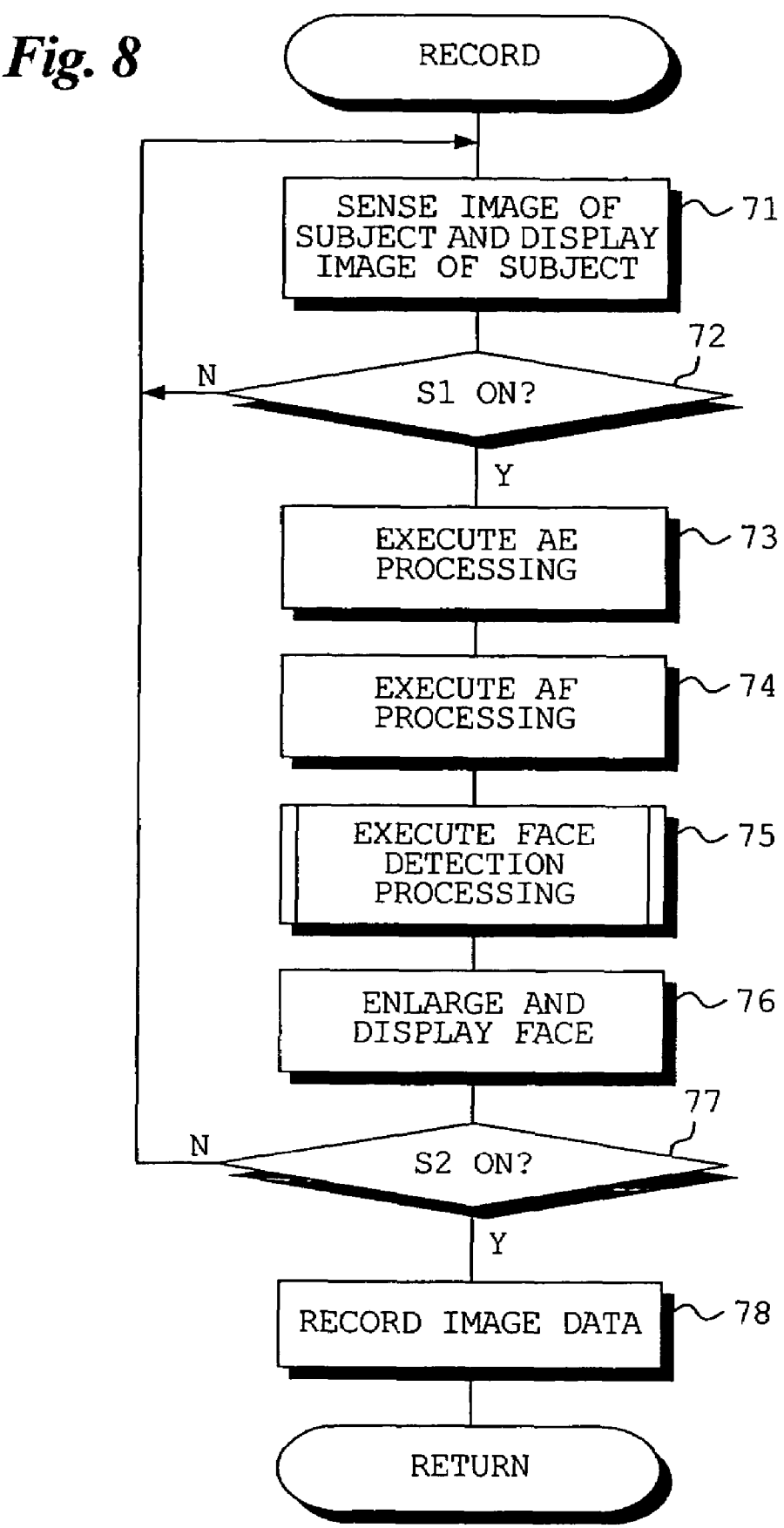
FIGS. 8 to 10 are flowcharts illustrating recording processing.

FIG. 8 is a flowchart illustrating another example of recording processing.

In the record processing illustrated in FIG. 2, enlargement processing is executed in response to depression of the enlargement button. In the processing illustrated in FIG. 8, however, enlargement processing is executed in response to depression of the two-step stroke shutter-release button through the first step of its stroke.

If the image sensing mode is set, the image of the subject is sensed and the image of the subject is displayed on the display screen of the display unit 16 (step 71). If the shutter-release button is pressed through the first step of its stroke ("YES" at step 72), then automatic exposure control processing (step 73) and autofocus control processing (step 74) is executed. Further, face detection processing is executed (step 75).

Furthermore, an indication that the shutter-release button has been pressed through the first step of its stroke is applied to the digital still camera as an expansion command, processing for enlarging the face image is executed as described above and the enlarged image of the subject is displayed (step 76).

If the shutter-release button has been pressed through the second step of its stroke ("YES" at step 77), the image data obtained by image sensing is recorded on a memory card (step 78).

Figure 9:
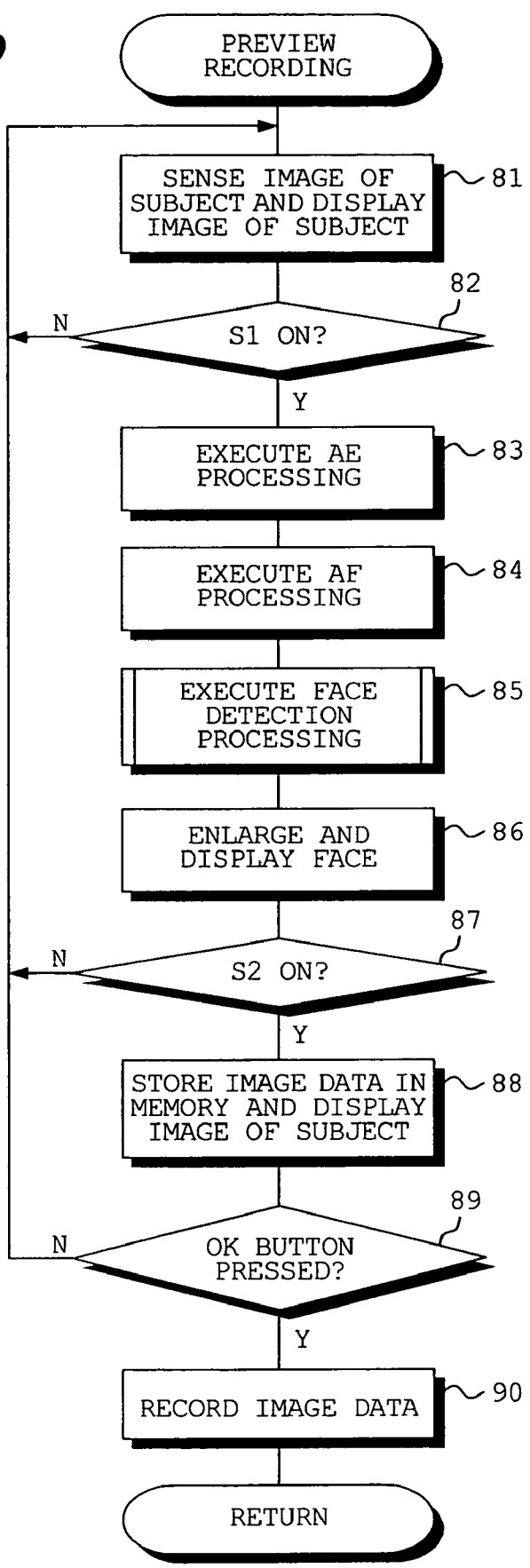

FIG. 9, which illustrates a further example of recording processing, is a flowchart of preview recording processing.

In the case of preview recording, the image data is stored in memory temporarily before it is recorded on the memory card. The image of the subject represented by this stored image data is displayed and, by applying a recording command anew, the image data is recorded on the memory card.

If the image sensing mode is set, the image of the subject is sensed and is displayed on the display screen of the display unit 16 (step 81). If the shutter-release button is pressed through the first step of its stroke ("YES" at step 82), then automatic exposure control processing (step 83) and autofocus control processing (step 84) is executed. Further, face detection processing is executed (step 85).

Furthermore, an indication that the shutter-release button has been pressed through the first step of its stroke is applied to the digital still camera as an expansion command, processing for enlarging the face image is executed as described above and the enlarged image of the subject is displayed (step 86).

If the shutter-release button is pressed through the second half of its stroke ("YES" at step 87), then image data obtained by image sensing is stored in the memory 7 temporarily (step 88). The image data is read from the memory 7 and the image of the subject represented by the read image data is displayed on the display screen of the display unit 16 (step 88). The user views the image of the subject displayed on the display screen and, if the image is acceptable, presses the OK button ("YES" at step 89). If this is done, the image data that has been stored temporarily in the memory 7 is applied to and recorded on the memory card 16.

Figure 10:
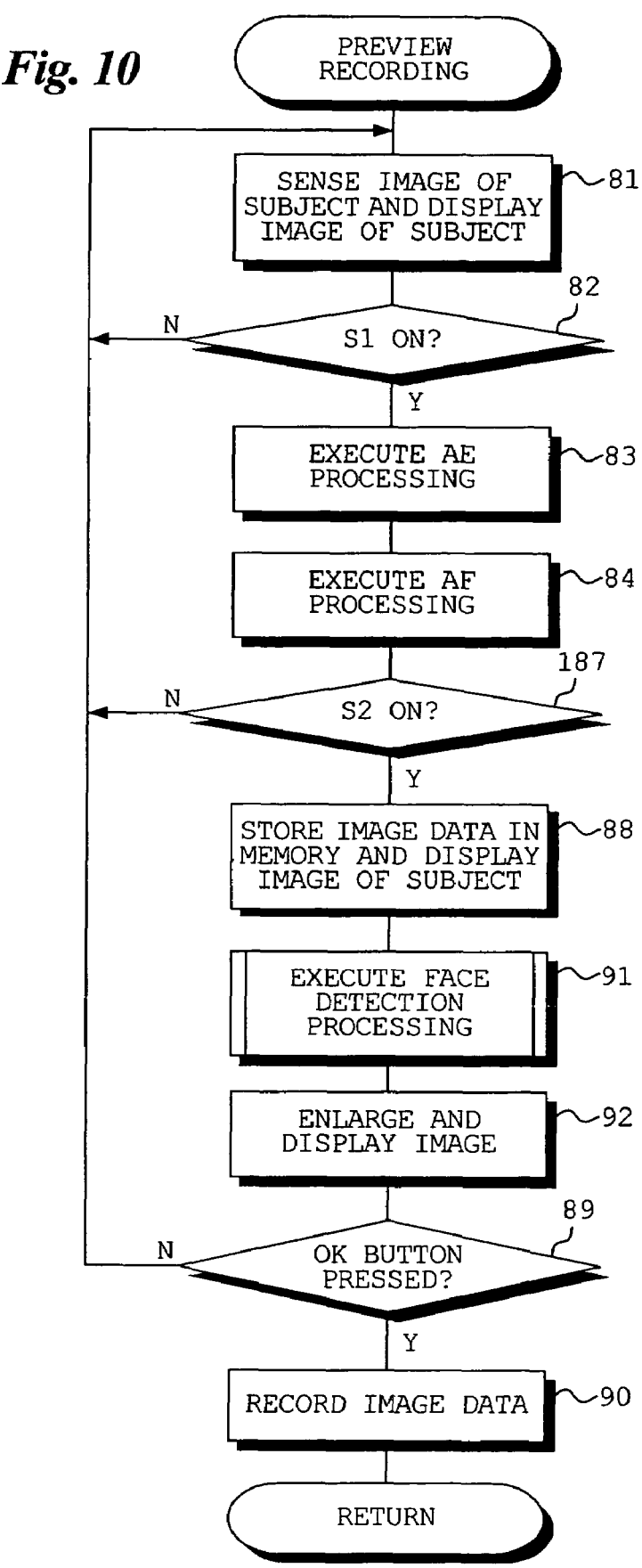

FIG. 10, which illustrates a further example of recording processing, is a flowchart of preview recording processing. Here processing steps identical with those shown in FIG. 9 are designated by like step numbers and need not be described again.

In the processing shown in FIG. 9, face detection processing (step 85 in FIG. 9) and face image enlarging and display processing (step 86) is executed in addition to automatic exposure control processing (step 83) and autofocus control processing (step 84) in response to depression of the shutter-release button through the first step of its stroke. In the processing illustrated in FIG. 10, however, face detection processing (step 91) and face image enlarging and display processing (step 92) is executed in response to depression of the shutter-release button through the second step of its stroke.

If the shutter-release button is pressed through the second half of its stroke ("YES" at step 87), then image data obtained by image sensing is stored in the memory 7 temporarily (step 88). The image data is read from the memory 7 and the image of the subject represented by the read image data is displayed on the display screen of the display unit 16 (step 88). This is followed by execution of the above-described face detection processing (step 91) and face image enlarging and display processing (step 92). The user views the image of the subject (the enlarged image of the face) displayed on the display screen and, if the image is acceptable, presses the OK button ("YES" at step 89). If this is done, the image data that has been stored temporarily in the memory 7 is applied to and recorded on the memory card 16.

Figure 11:
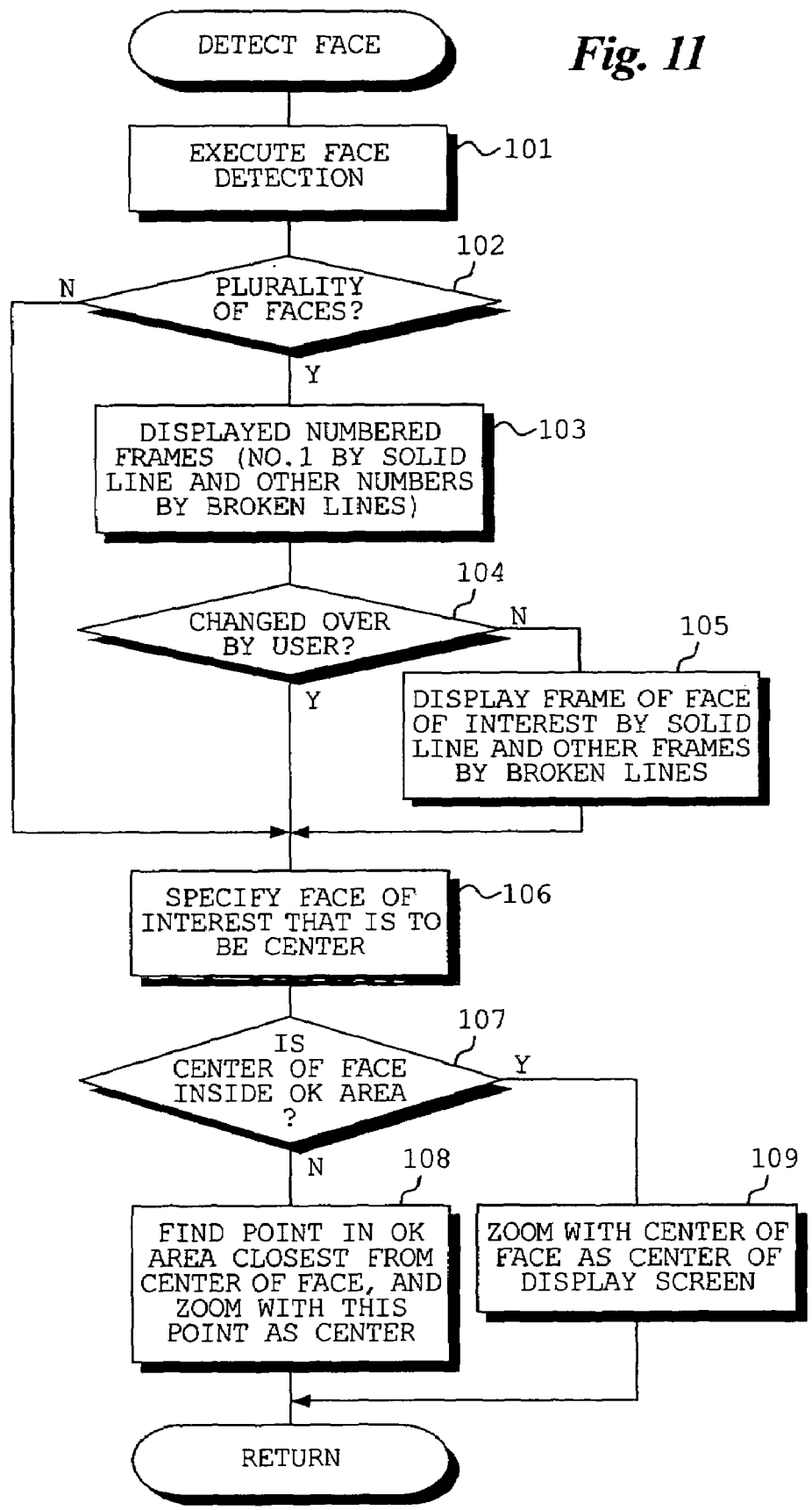
FIG. 11 is a flowchart illustrating processing for detecting a face.
Figure 12:
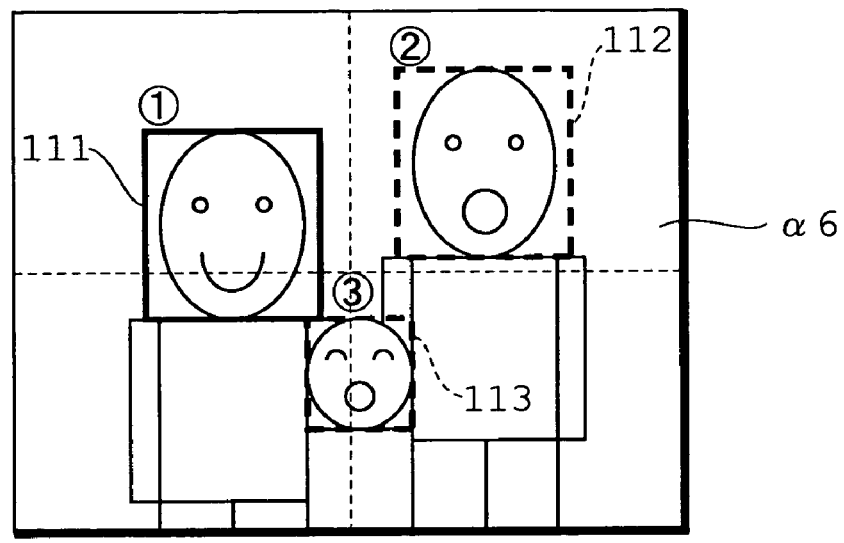
FIGS. 12 and 13 illustrate images of a subject before zooming.
Figure 13:
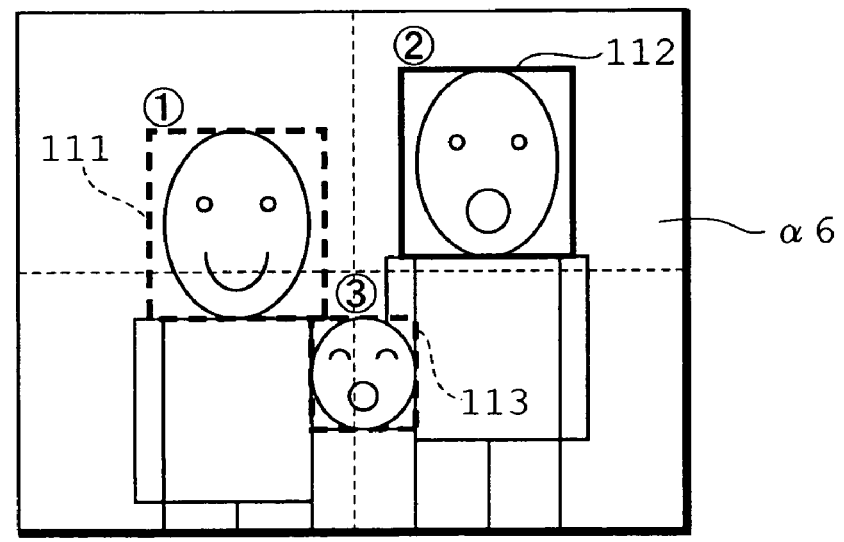

FIG. 11 is a flowchart illustrating other processing for detecting a face. This processing is for a case where the image of a subject contains a plurality of face images. FIGS. 12 and 13 illustrate examples of the image of a subject, prior to enlargement, displayed on the display screen. FIGS. 14a to 14d show examples of the image of the subject after enlargement. The centrally intersecting dashed lines being displayed on the display screen need not necessarily be displayed.

If the image of a subject contains a plurality of face images, a frame is displayed on each face image. These frames change in form in conformity with the facial likeliness of the image of the face within the frame. Further, the image of a face that is to become the central image at the time of enlargement can be designated and enlargement is performed in such a manner that the center of the designated face image will become the center of the display screen or will fall within the OK area, as described above.

Processing for detecting a face image in the image of a subject is executed (step 101). Whether a plurality of face images have been detected by this face detection processing is determined (step 102).

If there are a plurality of face images ("YES" at step 102), frames 111, 112 and 113 of the face images detected in the subject image α6 are displayed (step 103), as illustrated in FIG. 12. Numbers indicating the order of degrees of facial likeliness (degrees of matching with a sample image, or evaluation values) calculated by face detection processing are displayed on the frames 111, 112 and 113 of respective ones of the images. The frame of the face image judged to be that exhibiting the greatest facial likeliness among the detected face images is displayed in the form of a solid line, and the frames of the other images are displayed in the form of broken lines. Thus the user can tell at a glance which image among a plurality of face images is that judged to exhibit the greatest facial likeliness.

If the right arrow on the up, down, left, right button included on the digital still camera is pressed, a display changeover command for changing over the frame of the face image is applied to the digital still camera. If the right arrow is pressed, the camera construes that a changeover command has been applied by the user ("YES" at step 104), the frame of the face image judged to be that exhibiting the next greatest facial likeliness is indicated by the solid line and the other frames are indicated by the broken lines (step 105). For example, if the right arrow is pressed when the display is in the state shown in FIG. 12, then the frame 112 will be indicated by the solid line and the other frames 111 and 113 will be indicated by the broken lines. If there is no changeover command from the user ("NO" at step 104), then the processing of step 105 is skipped.

The image enclosed by the broken line is construed as being a specific face image (step 106) and it is determined whether the center of this specific face image lies within the OK area (step 107). If this face image lies within the OK area ("YES" at step 107), zoom processing is performed in such a manner that the center of the face image will become the center of the display screen (step 109). If this face image does not lie within the OK area ("NO" at step 107), the image of the subject is shifted in such a manner that a point in the OK area that is nearest from the center of the face image will become the center of the face image and zoom processing is then executed (step 108).

Figure 14B:
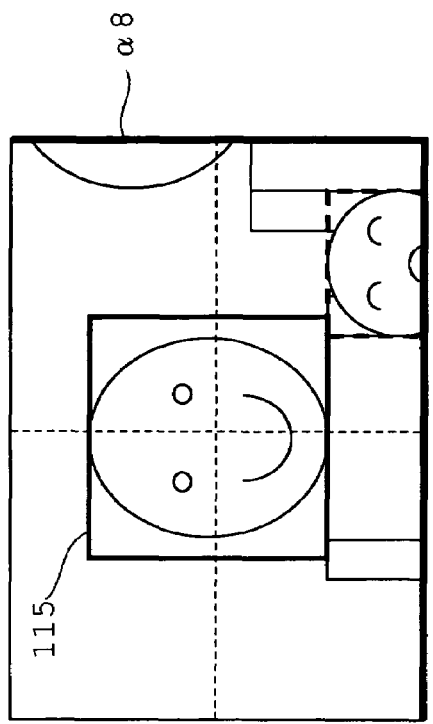
FIGS. 14a to 14d are examples of a subject after zooming.
Figure 14D:
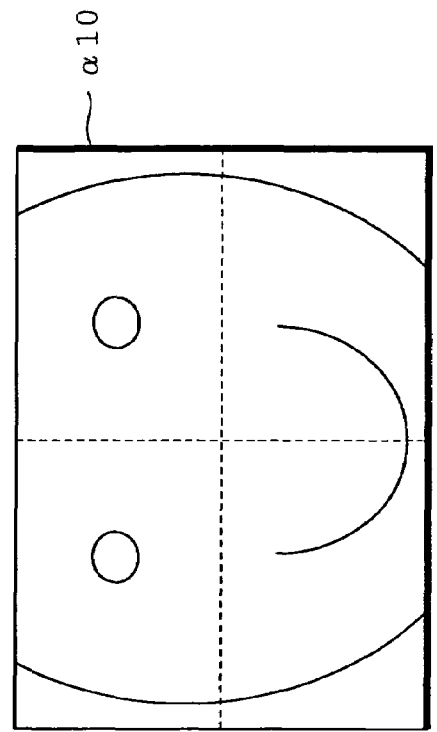
Figure 14A:
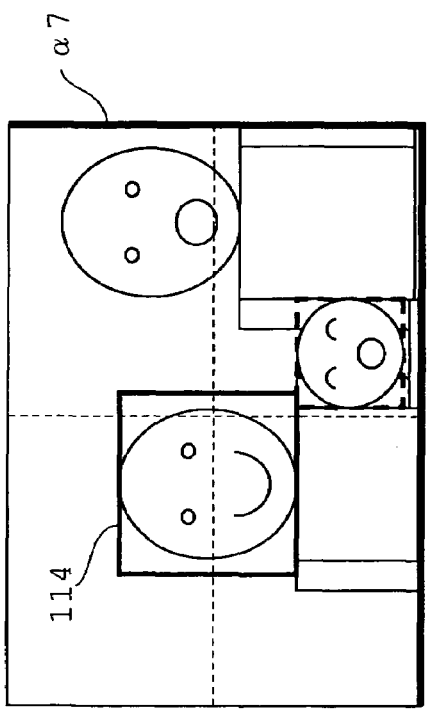
Figure 14C:
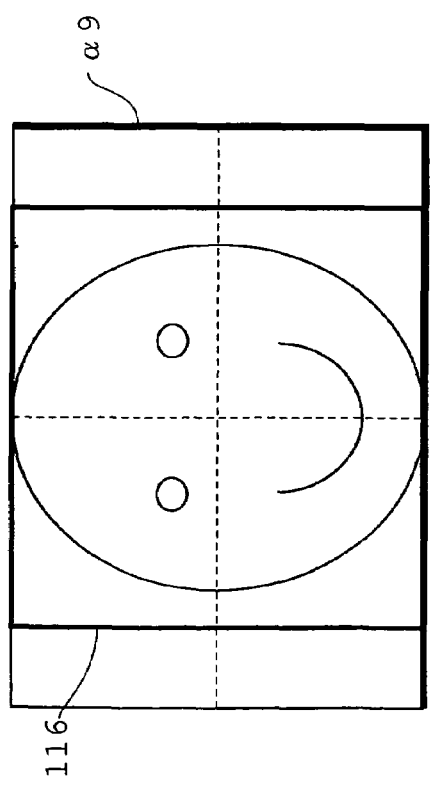

When the zoom magnification is low, the center of the face image that has been specified will not fall within the OK area and therefore the center of the specified face image (the image within frame 114) will not necessarily be the center of the display screen (subject image α7), as illustrated in FIG. 14a. As the zoom magnification rises, subject images α8, α9, α10 are enlarged in such a manner that the center of the specified face image will become the center of the display screen, as illustrated in FIGS. 14b, 14c, 14d.

Figure 15:
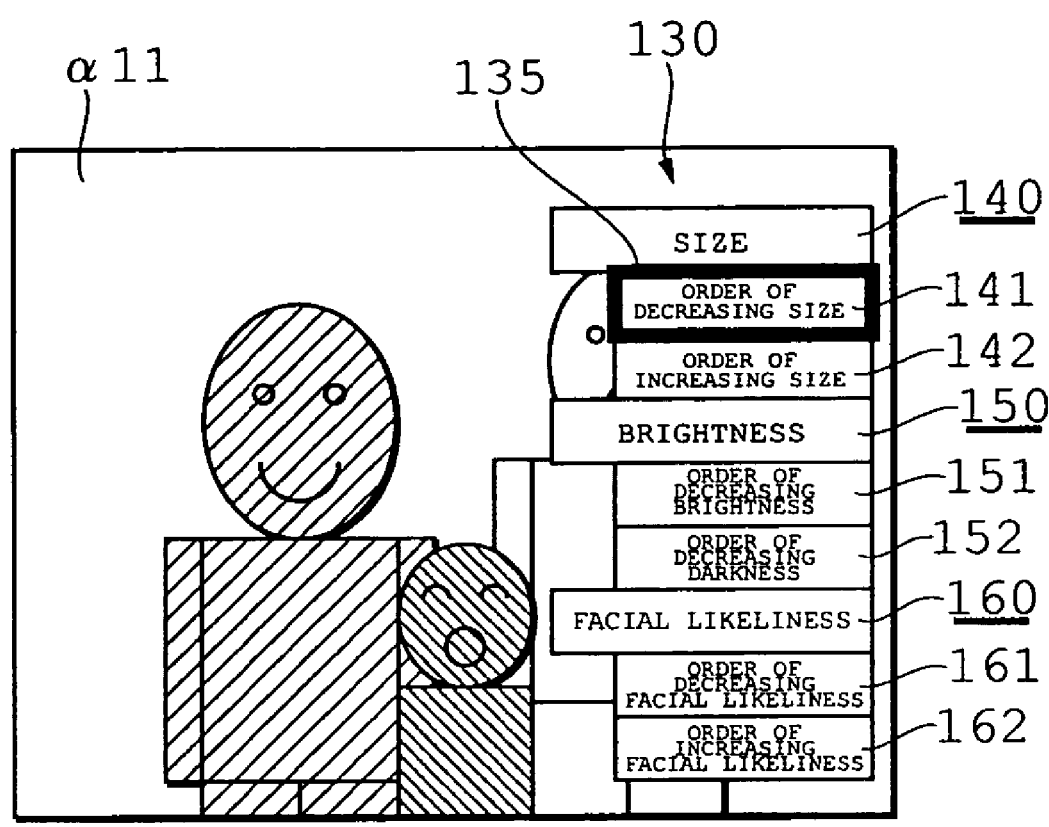
FIG. 15 illustrates a factor setting menu.

FIG. 15 illustrates an example of a subject image α11 displayed on the display screen of the display unit 16.

The above-described embodiment is such that if a plurality of face images are contained in the image of a subject, a factor that is the degree of facial likeliness of a face image is used in order to decide the order of the plurality of face images. However, in an embodiment described below, the order of a plurality of face images is decided using factors other than the facial-likeliness factor. Which factor is used to decide the order of a plurality of face images is specified by the user.

The operating device 15 of the digital still camera includes a menu button which, by being pressed, causes a menu that can be set by the camera to be displayed on the display screen of the display unit 16. The menu includes a factor setting menu. In response to designation of the factor setting menu by the user, a factor setting menu 130 of the kind shown in FIG. 15 appears on the display screen of the display unit 16.

The factors that can be set in this embodiment include "SIZE", "BRIGHTNESS" and "FACIAL LIKELINESS". Of course, it may be so arranged that other factors can be set. The factor setting menu 130 includes an area 140 in which the characters "SIZE" are being displayed, and area 150 in which the characters "BRIGHTNESS" are being displayed, and an area 160 in which the characters "FACIAL LIKELINESS" are being displayed.

If size is set as a factor, "ORDER OF DECREASING SIZE" or "ORDER OF INCREASING SIZE" can be set. The factor setting menu 130, therefore, includes an area 141 in which characters indicating "ORDER OF INCREASING SIZE" and an area 142 in which characters indicating "ORDER OF DECREASING SIZE" are being displayed. Further, if brightness is set as a factor, "ORDER OF DECREASING BRIGHTNESS" or "ORDER OF INCREASING DARKNESS" can be set. The factor setting menu 130, therefore, includes an area 151 in which characters indicating "ORDER OF DECREASING BRIGHTNESS" and an area 152 in which characters indicating "ORDER OF DECREASING DARKNESS" are being displayed. If facial likeliness is set as a factor, "ORDER OF DECREASING FACIAL LIKELINESS" or "ORDER OF INCREASING FACIAL LIKELINESS" can be set. The factor setting menu 130, therefore, includes an area 161 in which characters indicating "ORDER OF DECREASING FACIAL LIKELINESS" and an area 162 in which characters indicating "ORDER OF INCREASING FACIAL LIKELINESS" are being displayed.

A cursor 135 is displayed so as to enclose any area of the areas in the factor setting menu 130. The cursor 135 is moved up or down from one area to the next in accordance with operation of an up/down button on the operating device 15. If an ENTER key included in the operating device 15 is pressed, the factor represented by the area enclosed by the cursor 135 is set.

Figure 16:
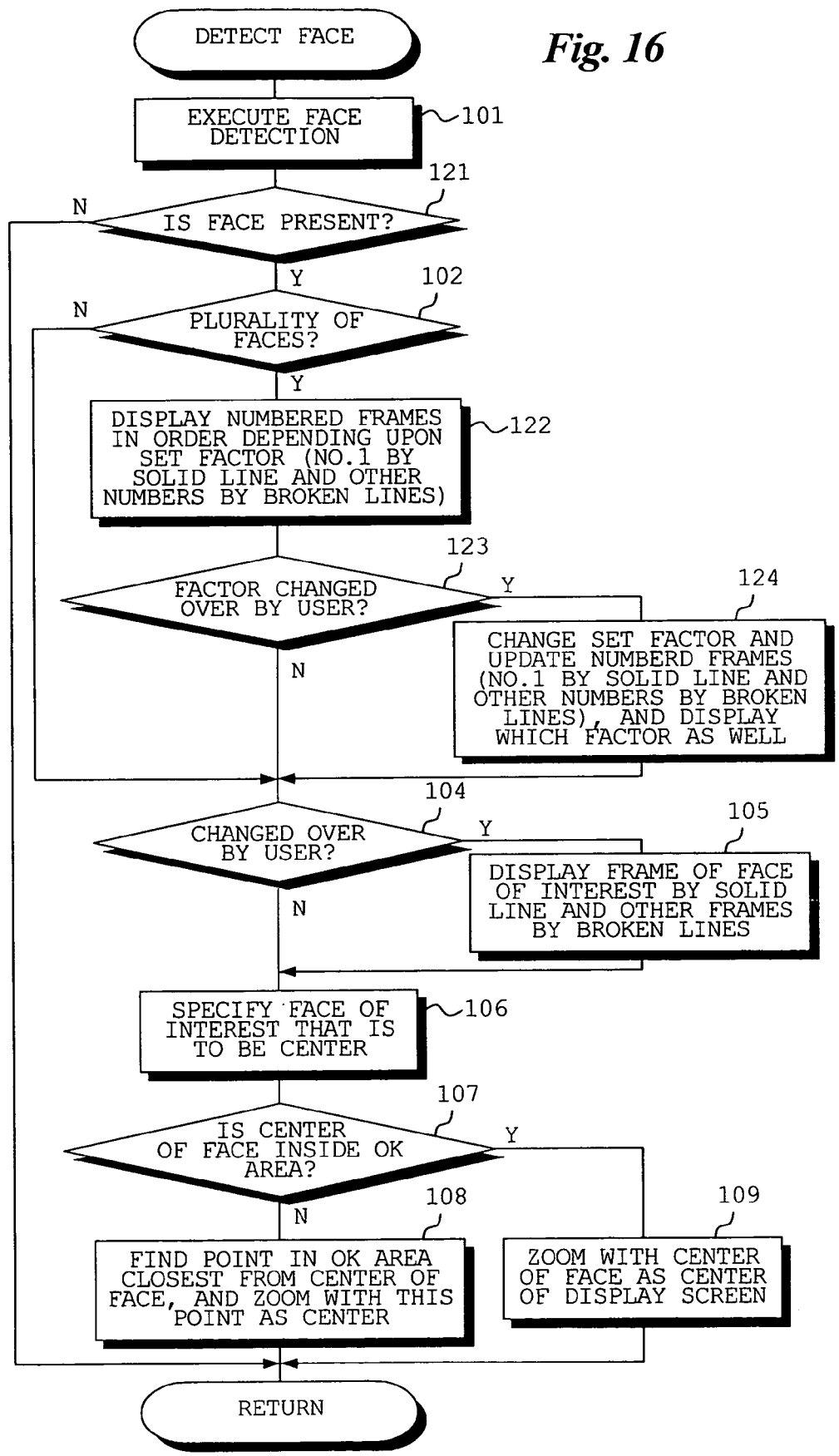
FIG. 16 is a flowchart illustrating processing for detecting a face.
Figure 17:
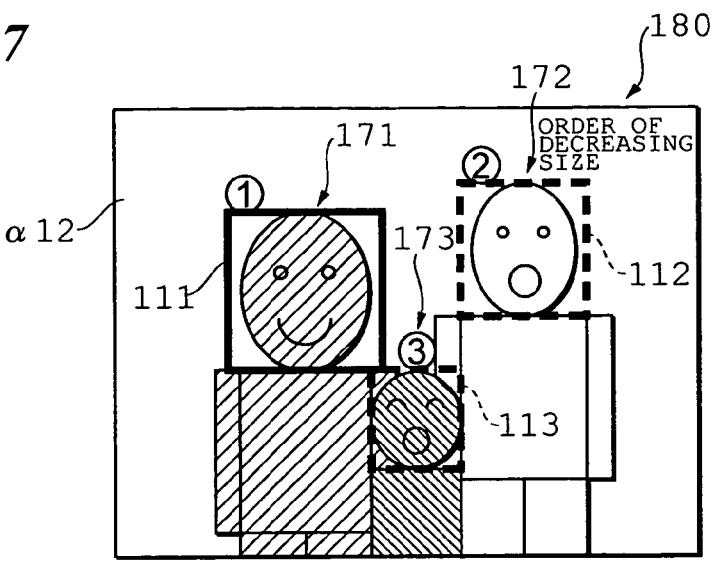
FIGS. 17 to 19 illustrate images of a subject before zooming.
Figure 18:
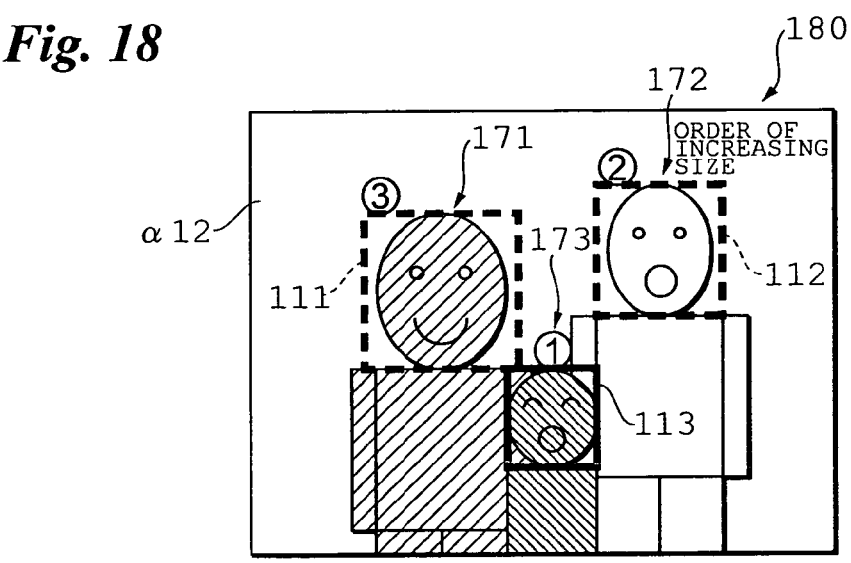
Figure 19:
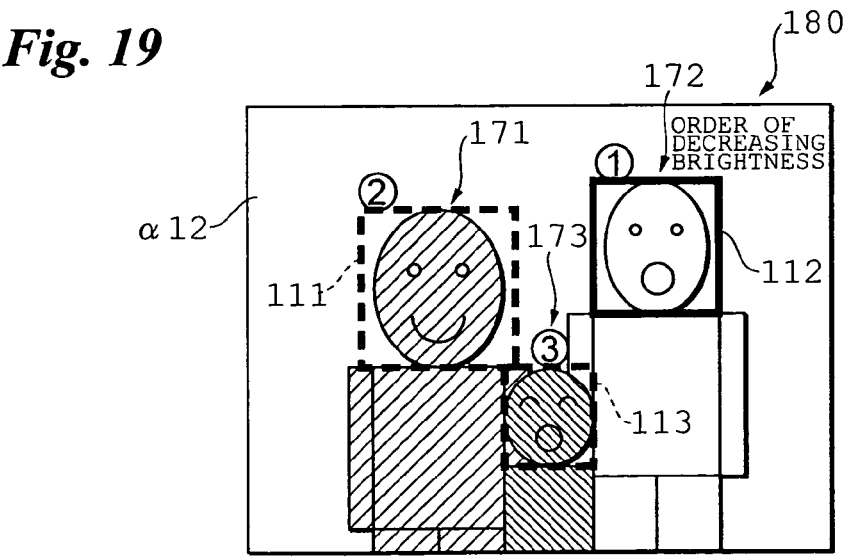

FIG. 16 is a flowchart illustrating other processing for detecting a face, and FIGS. 17 to 19 illustrate images of a subject, before zooming, displayed on the display screen.

Processing steps in FIG. 16 identical with those shown in FIG. 11 are designated by like step numbers and need not be described again. The face detection processing shown in FIG. 11 is such that if the image of a subject contains a plurality of face images, the form of a frame displayed on a face image changes in dependence upon facial likeliness. In the face detection processing shown in FIG. 16, however, a factor that is for changing the form of a frame is decided in accordance with a user setting, and the factor can be changed over by the user.

Processing for detecting a face image in the image of a subject is executed (step 101). It is determined whether the image of the subject contains the image of a face (step 121). If the image of the subject contains the image of a face ("YES" at step 121) and, moreover, the image of the subject contains a plurality of face images ("YES" at step 102), then the image of the subject is displayed with each of the plurality of face images being enclosed by a frame. In particular, in this embodiment, the plurality of face images are numbered in order based upon the factor set by the user in the manner described above, and the numbers that are in accordance with this order are attached close to the frames. The face image that has been decided as No. 1 in accordance with the factor is enclosed by a solid-line frame, and the other frames are indicated by broken lines.

FIG. 17 illustrates an example of the image of a subject in a case where order of decreasing size of detected face images has been set as a factor. An area 180 in which the set factor is displayed at the upper right of the display screen is displayed. Since order of decreasing size has been set as the factor, the characters "ORDER OF DECREASING SIZE" are being displayed in the factor display area 180.

A subject image α12 contains images 171, 172 and 173 of persons. The face images of these persons decrease in size in the order of the images 171, 172, 173. Accordingly, numbers ①, ②, ③ indicating the size order of the face images are being displayed in the vicinity of frames 111, 112, 113 of the face images of the person images 171, 172, 173, respectively. In particular, frame 111 of the face image of the person image 171 having the largest face image is indicated by the solid line. The frames 112, 113 of the face images of the other person images 172, 173 are indicated by the broken lines (step 122). Thus the user can ascertain in what order the face images have been numbered.

If the factor is changed over by the user in the manner described above ("YES" at step 123), then the order of the detected face images is decided beforehand based upon the changed factor. The order displayed near the frames of the face images is updated based upon the changed factor (step 124). Since the face images increase in size in the order of the face images of person images 173, 172, 171, as shown in FIG. 18, the numbers are appended in the order of frames 113, 112, 111. Further, frame 113 is indicated by a solid line and the other frames 112 and 111 by broken lines. If the factor is changed over to order of decreasing brightness, the face images increase in brightness in the order of the face images of person images 172, 171, 173, as shown in FIG. 19 (brightness is indicated by hatching), and therefore the numbers are appended in the order of frames 112, 111, 113. Frame 112 is indicated by a solid line and the other frames 111 and 113 by broken lines. Thus, the factor can be changed in accordance with the user setting and the order of the face images also changes in dependence upon the changed factor.

If the factor is not changed ("NO" at step 123), then the processing of step 124 is skipped and processing from step 104 onward is executed.

In the embodiment above, the order of the face images is decided in accordance with the order of size, order of brightness, etc. It may be so arranged that if a fixed range of sizes or brightnesses is provided and a face image falls within this fixed range, then this face image is adopted as a face-image candidate that should participate in deciding the order of the face images. For example, a situation is conceivable in which a face image that is too bright, a face image that is too dark, a face image that is too big and a face image that is too small are excluded from the face images that decide the order of the face images even if the factors of order of decreasing brightness, order of decreasing darkness, order of decreasing size and order of increasing size, respectively, have been designated. Thus, numbers can be appended in regard to face images that are suitable for appreciation.

Figure 20:
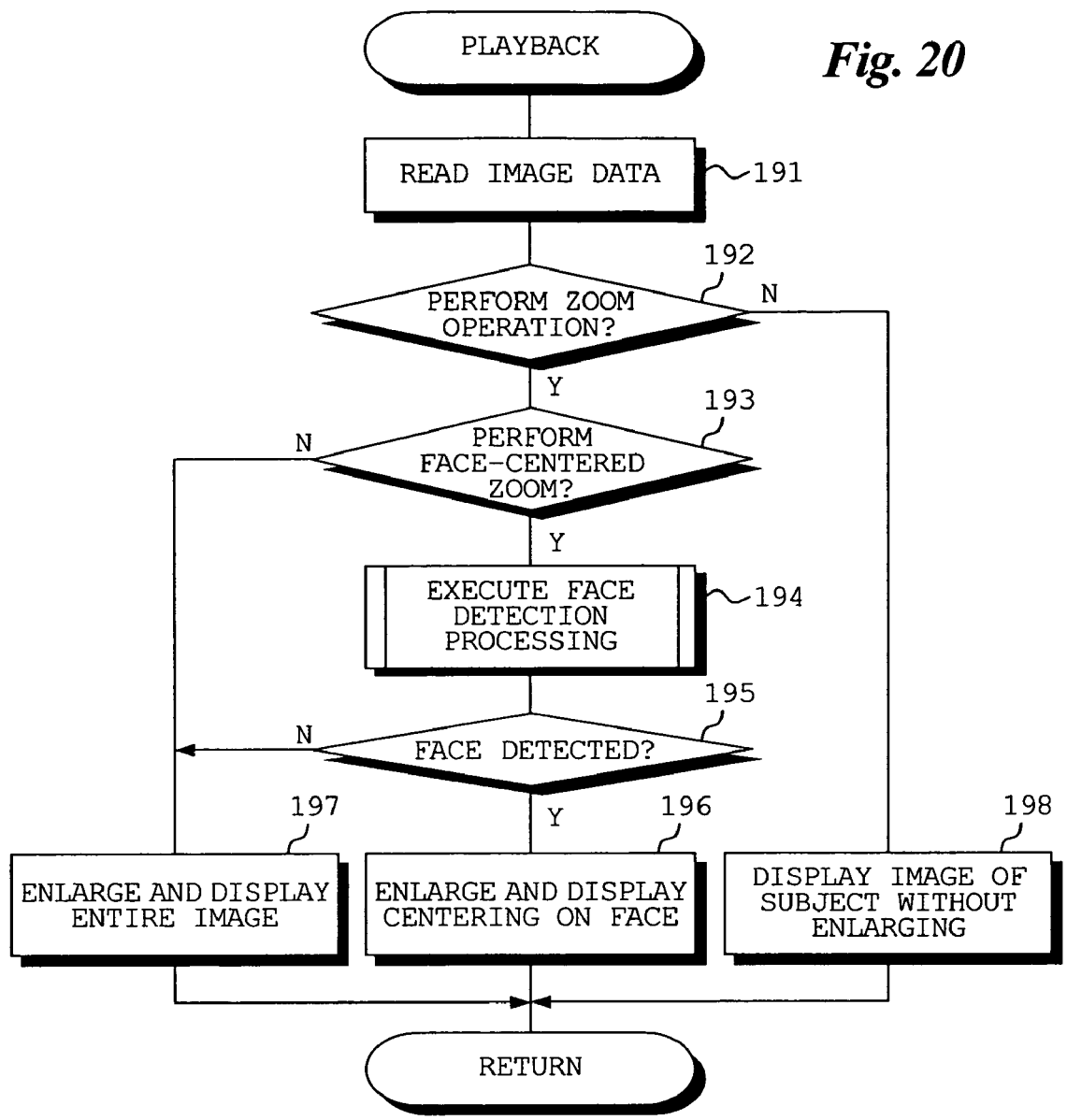
FIG. 20 is a flowchart illustrating reproduction processing.

FIG. 20 is a flowchart illustrating processing executed at the time of playback.

In the embodiments above, face detection processing is executed at the time of recording. However, as mentioned above, it can be so arranged that face detection processing is executed at the time of playback as well.

It is assumed that whether a zoom operation is performed or zooming that is centered on a face is performed with regard to a reproduced image has been set in advance by using a menu. Of course, it may be so arranged that the zoom operation or zooming centered on a face is performed based upon an enlargement command from an enlargement command button.

If the playback mode is set, image data that has been recorded on the memory card 9 is read (step 191). If a setting has not been made to perform the zoom operation ("NO" at step 192), the image of the subject represented by the read image data is displayed on the display screen of the display unit 16 without being enlarged (step 198). If a setting has been made to perform the zoom operation ("YES" at step 192), then it is determined whether a setting has been made to perform a face-centered zoom (step 193).

If a setting to perform face-centered zoom has not been made ("NO" at step 193), then the entire image of the subject represented by the read image data is enlarged and displayed on the display screen of the display unit 16 (step 197).

If a setting to perform face-centered zoom has been made ("YES" at step 193), then processing for detecting a face in the image of the subject represented by the read image data is executed in the manner described above (step 194). If a face is detected in the image of the subject ("YES" at step 195), then the image of the face is displayed upon being enlarged (step 196), as described above. Since enlargement is performed with emphasis on the image of the face at the time of playback, whether or not the image of the face is in focus can be checked comparatively simply. If the image of a face is not detected in the image of the subject ("NO" at step 195), then the entire image of the subject is displayed upon being enlarged (step 197).

In the embodiments described above, enlargement is performed with emphasis on the image of a face based upon the setting for performing a face-centered zoom, the enlargement command, etc. However, it may be so arranged that enlargement is performed with emphasis on the image of a face in automatic fashion in response to playback of the image of a subject even if there is no zoom setting or command, etc.

As many apparently widely different embodiments of the present invention can be made without departing from the spirit and scope thereof, it is to be understood that the invention is not limited to the specific embodiments thereof except as defined in the appended claims.

What is claimed is:

1. A digital still camera comprising:
   an image sensing device for sensing an image of a subject and outputting image data representing the image of the subject;
   a display device for displaying the image of the subject, which is represented by the image data that has been output from said image sensing device, on a display screen;
   a face image detecting device for detecting a face image contained in the image of the subject represented by the image data that has been output from said image sensing device;
   an enlargement command device for applying an enlargement command;
   an enlarging device for enlarging the face image, which has been detected by said face image detecting device, in response to application of the enlargement command from said enlargement command device;
   a first determination device for determining whether portions outside the image of the subject represented by the image data that is output from said image sensing device will be displayed on the display screen owing to the fact that the center of the face image that has been enlarged by said enlarging device becomes the center of the display screen based upon control by said first display control device;
   a decision device for deciding a position of the center of the face image, which has been enlarged by said enlarging device, in such a manner that portions outside the image of the subject will not be displayed on the display screen, in response to a determination by said first determination device that the portions outside the image of the subject will be displayed on the display screen;
   a first display control device for controlling the display device in such a manner that the face image enlarged by said enlarging device, the center of the enlarged face image will become the position decided by said decision device, is displayed on the display screen;
   a shutter-release button; and
   a recording control device for recording the image data, which has been output from said image sensing device, on a recording medium in response to depression of said shutter-release button.

2. The camera according to claim 1, wherein said shutter-release button comprises a two-step stroke type;
   said enlargement device enlarges the face image, which has been detected by said face image detecting device, in response to depression of said shutter-release button through a first step of its stroke; and
   said recording control device records the image data, which has been output from said image sensing device, in response to depression of said shutter-release button through a second step of its stroke.

3. The camera according to claim 1, further comprising a second determination device for determining whether the center of the face image detected by said face image detecting device lies within a predetermined area on the display screen;
   wherein said first display control device responds to a determination by said second determination device that the center of the detected face image lies within the predetermined area by controlling said display device in such a manner that the center of the enlarged face image becomes the center of the display screen, and responds to a determination by said second determination device that the center of the detected face image does not lie within the predetermined area by deciding the position of the center of the face image in such a manner that portions outside the image of the subject will not be displayed on the display screen and controlling said display device in such a manner that the center of the enlarged image will be displayed at said decided position.

4. The camera according to claim 1, wherein said face image detecting device includes an evaluation-value calculating device for calculating an evaluation value of facial likeliness with respect to part of an image contained in the subject, said face image detecting device detecting the image of a face based upon the evaluation value calculated by said evaluation-value calculating device, and said camera further comprises:
   a third determination device for determining whether a plurality of face images have been detected by said face image detecting device;
   a second display control device, responsive to a determination by said second determination device that there are a plurality of face images, for controlling said display device in such a manner that the order of facial likelinesses of the plurality of face images is displayed on the display screen in correspondence with the plurality of face images; and
   a designating device for designating one face image among the plurality of face images;
   said enlarging device enlarging the face image that has been designated by said designating device.

5. The camera according to claim 4, further comprising a third display control device for controlling said display device in such a manner that areas of the plurality of face images are displayed in different forms based upon the order of the facial likelinesses.

6. The camera according to claim 1, further comprising:
a fourth determination device for determining whether a plurality of face images have been detected by said face image detecting device;
a decision device, responsive to a determination by said fourth determination device that there are a plurality of face images, for deciding the order of the plurality of face images based upon at least one factor from among facial likelinesses of the face images, brightnesses of the face images and sizes of the face images;
a third display control device for controlling said display device in such a manner that the order of the face images decided by said decision device is displayed on the display screen in correspondence with the plurality of face images; and
a designating device for designating one face image among the plurality of face images;
wherein said enlarging device enlarges a face image that has been designated by said designating device.

7. The camera according to claim 6, further comprising a factor designating device for designating at least one factor among the facial likelinesses of the face images, brightnesses of the face images and sizes of the face images used in deciding the order of the plurality of face images in said decision device;
wherein said decision device decides the order of the plurality of face images based upon the factor that has been designated by said factor designating device.

8. A method of controlling a digital still camera, which is provided with a shutter-release button, for sensing the image of a subject and obtaining image data representing the image of the subject, and further having a display device for displaying the image of the subject, which is represented by the obtained image data, on a display screen, said method comprising:
detecting a face image contained in the image of the subject represented by the obtained image data;
enlarging the detected face image in response to application of an enlargement command;
determining whether portions outside the image of the subject represented by the image data that is output will be displayed on the display screen owing to the fact that the center of the face image that has been enlarged becomes the center of the display screen based upon control;
deciding a position of the center of the face image, which has been enlarged, in such a manner that portions outside the image of the subject will not be displayed on the display screen, in response to a determination that the portions outside the image of the subject will be displayed on the display screen;
controlling the display device in such a manner that the enlarged face image, the center of the enlarged face image will become the position decided, is displayed on the display screen; and
recording the image data, which has been obtained by image sensing, on a recording medium in response to depression of the shutter-release button.

* * * * *